United States Patent
Nakai et al.

(10) Patent No.: US 7,003,095 B2
(45) Date of Patent: Feb. 21, 2006

(54) ACOUSTIC ECHO CANCELER AND HANDSFREE TELEPHONE SET

(75) Inventors: Takehiro Nakai, Kawasaki (JP); Hiroshi Katayama, Kawasaki (JP); Chiharu Kawai, Kawasaki (JP); Hideaki Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 09/809,929

(22) Filed: Mar. 16, 2001

(65) Prior Publication Data
US 2002/0039414 A1     Apr. 4, 2002

(30) Foreign Application Priority Data
Sep. 29, 2000   (JP) ............................. 2000-301087

(51) Int. Cl.
*H04M 9/08* (2006.01)

(52) U.S. Cl. .................... 379/406.01; 379/406.02; 379/406.05; 379/406.06; 379/406.08; 379/406.09

(58) Field of Classification Search ............... 379/408, 379/388, 406.06, 406.08, 406.01; 708/322
See application file for complete search history.

(56) References Cited

U.S. PATENT DOCUMENTS

| | | | | |
|---|---|---|---|---|
| 5,187,692 A * | 2/1993 | Haneda et al. | ............... | 367/135 |
| 5,187,741 A * | 2/1993 | Erving et al. | .......... | 379/406.07 |
| 5,815,580 A * | 9/1998 | Craven et al. | ................ | 381/58 |
| 6,574,336 B1 * | 6/2003 | Kirla | ..................... | 379/406.01 |
| 6,744,887 B1 * | 6/2004 | Berstein et al. | ........ | 379/406.08 |

* cited by examiner

*Primary Examiner*—Sinh Tran
*Assistant Examiner*—Ramnandan Singh
(74) *Attorney, Agent, or Firm*—Katten Muchin Rosenman LLP

(57) ABSTRACT

The present invention provides an acoustic echo canceler for use in a telephone set having a handsfree conversation function. This acoustic echo canceler simultaneously achieves both the stabilization and speedup of an estimation operation and also attains the more improvement of speech quality. Moreover, the present invention provides a handsfree telephone set employing this acoustic echo canceler. Furthermore, this acoustic echo canceler is operative to cancel an echo generated by inputting an output of an acoustic device to itself substantially simultaneously with the outputting the output thereof. Further, this acoustic echo canceler comprises an adaptive filter for performing an operation of estimating the frequency characteristic and the phase characteristic of a part, whose frequency characteristic and phase characteristic vary, on an acoustic path and a fixed coefficient filter for simulating a part, whose frequency characteristic and phase characteristic are fixed, on the acoustic path.

9 Claims, 14 Drawing Sheets

ACOUSTIC ECHO CANCELER AND HANDSFREE TELEPHONE SET

BACKGROUND OF THE INVENTION

1. Field of the Invention

The present invention generally relates to an echo canceler and, more particularly, to an acoustic echo canceler for use in a telephone set (hereunder referred to simply as a "handsfree telephone set") having a handsfree conversation function.

2. Description of the Related Art

Handsfree telephone sets are preferably used in various places and situations and have a high frequency of use because of no necessity for picking up a handset at each telephone call. However, generally, there has been a problem of echo generated during a handsfree conversation mode by feeding back and inputting voices, which are outputted by a speaker, to a microphone. It is, thus, necessary for favorably talking over a telephone to cancel such echo. Hitherto, many pieces of research on an echo canceler for canceling echo have been conducted. Particularly, an echo canceler for canceling acoustic echo generated in a system employing a speaker and a microphone is sometimes referred to as an "acoustic echo canceler".

Figure 1:
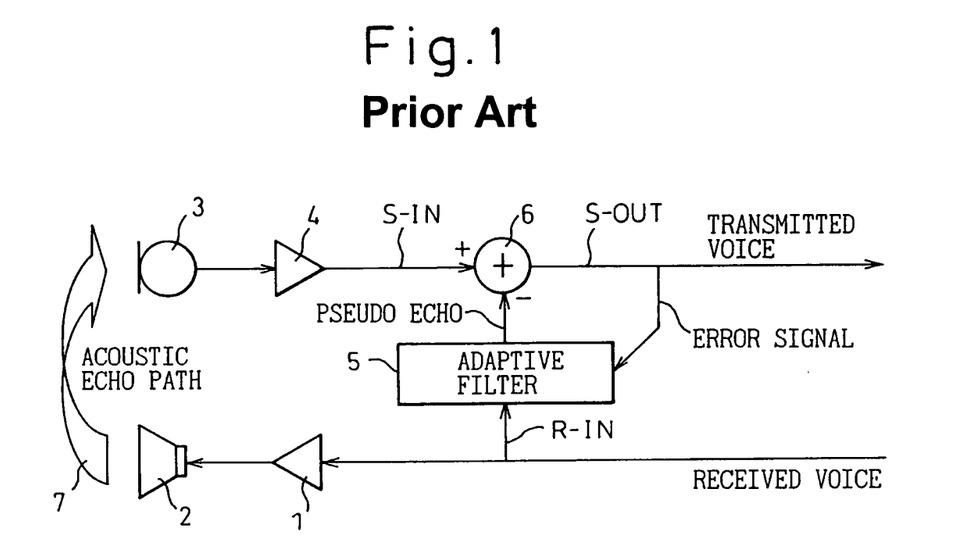
FIG. 1 is a block diagram illustrating the constitution of a conventional acoustic echo canceler.

FIG. 1 is a block diagram illustrating the configuration of a conventional acoustic echo canceler employed in a handsfree telephone set.

In FIG. 1, reference numeral 1, 2, 3, 4, 5, 6, and 7 designate a speaker amplifier, a speaker, a microphone, a microphone amplifier, an adaptive filter, an adder, and an acoustic echo path, respectively. Incidentally, a main body (not shown) of a telephone set is placed on the right side in FIG. 1.

A voice signal received by the main body of the telephone set of a called party from a calling party is amplified by the speaker amplifier 1. Then, the amplified voice signal is outputted from the subsequent speaker 2. A part of an output of the speaker 2 is inputted to the microphone 3 through the acoustic echo path 7. Then, a signal obtained by the microphone 3 therefrom is amplified by the microphone amplifier 4. Subsequently, this amplified signal (S-IN) is inputted to one of input terminals of the adder 6. On the other hand, an output signal of the adaptive filter 5 for generating a pseudo echo signal in response to the input of the received voice signal as an input signal (R-IN) is inputted to the other input terminal of the adder 6. Then, an output signal (S-OUT) of the adder 6 is used as another input signal (namely, an error signal) to the adaptive filter 5, and also transmitted from the main body of the telephone set to the calling party as a transmitted voice signal.

The adaptive filter 5 estimates the frequency characteristic (or response) and the phase characteristic of the echo path, that is, the frequency characteristic and the phase characteristic, which are synthesized from those of the speaker amplifier 1, the speaker 2, the acoustic echo path 7, the microphone 3, and the microphone amplifier 4. Moreover, the adaptive filter 5 sequentially updates filter coefficients so that the filter coefficients of the adaptive filter 5 have the same characteristics as the estimated characteristics. Consequently, the received voice signal having passed through the adaptive signal becomes a signal (that is, a pseudo echo signal), which is close to an echo signal inputted to the microphone 3. Thus, an echo signal inputted to a positive input terminal (+) of the adder 6 is canceled by inputting the pseudo echo signal to a negative input terminal (−) thereof.

Figure 2:
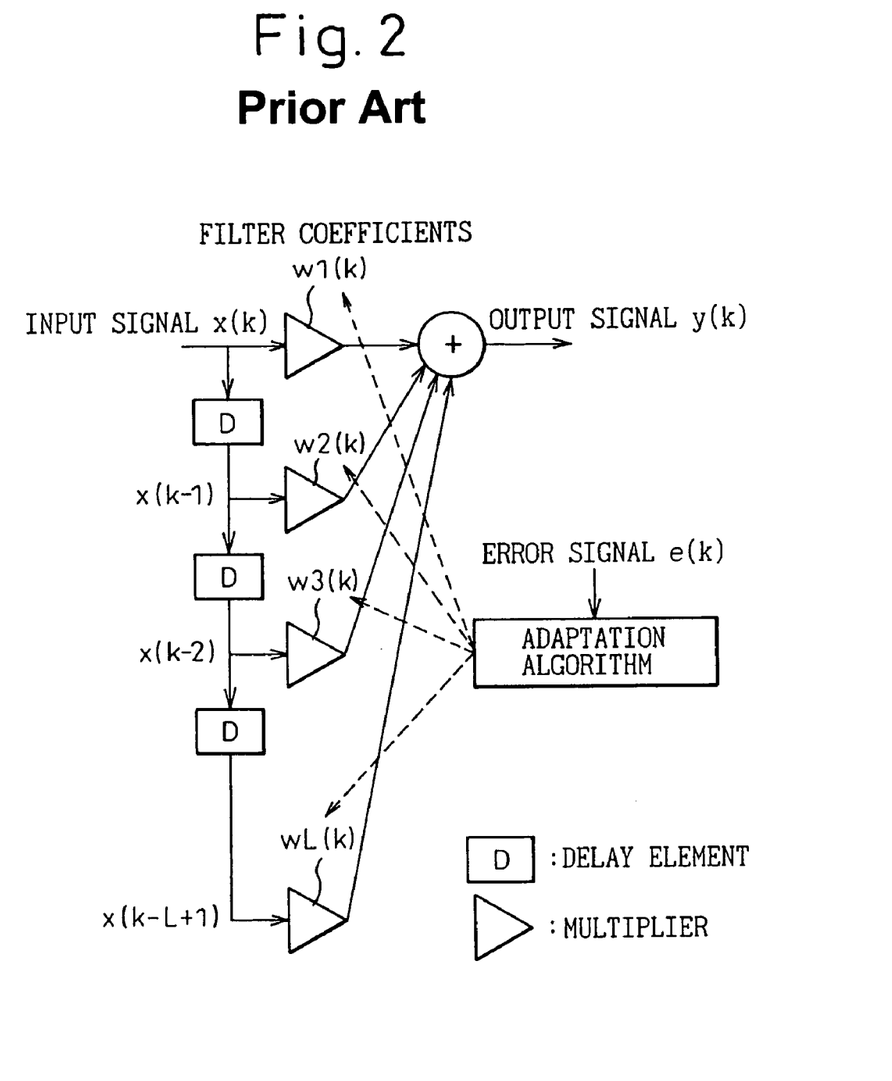
FIG. 2 is a diagram illustrating the constitution of an adaptive filter.

FIG. 2 illustrates an ordinary constitution of the adaptive filter 5.

In FIG. 2, reference character x(k) designates an input signal to the adaptive filter 5. Signals outputted from delay elements D, through which signals x(k), ¬, pass, are designated by x(k−1), x(k−2), ¬, x(k−L+1), respectively. A total sum of results of multiplying each of the signals x(k−1), x(k−2), ¬, x(k−L+1) by a corresponding one of filter coefficients w1(k), w2(k), ¬, wL(k) is represented by an output signal y(k) of the adaptive filter 5. Incidentally, "L" denotes a total number of filter coefficients.

A filter of such a constitution is known as an FIR (Finite Impulse Response) filter. The FIR filter is enabled by setting the filter coefficients thereof to have an arbitrary frequency characteristic and a given phase characteristic. The filter coefficients w1(k), w2(k), ¬, wL(k) are updated according to an adaptation algorithm in such a manner as to minimize the magnitude of an error signal e(k). Generally, the filter coefficients in an initial state are initialized by being set at zero. A learning identification method is known as an example of the adaptation algorithm.

An adaptation operation of the adaptive filter 5 is performed according to the signal R-IN and the error signal. The adaptive filter 5 updates the filter coefficients in such way as to minimize the magnitude of the error signal. However, the error signal includes background noise to be inputted to the microphone 3 and also includes thermal noise of the microphone amplifier 4. The presence of these noise components hinders the adaptive filter 5 from performing the adaptation operation so as to make the frequency characteristic and the phase characteristic approximate to those of the echo path. Thus, the difference between the pseudo echo, which is obtained by letting the received voice signal through the adaptive filter 5, and the signal S-IN increases. Consequently, the presence of the noise components becomes a cause of the drawback that an echo cancellation amount, namely, an amount of echo cancellation is insufficient.

Furthermore, the frequency characteristics and the phase characteristics estimated by the adaptive filter 5 are those of the speaker amplifier 1, the speaker 2, the acoustic echo path 7, the microphone 3, and the microphone amplifier 4. Among these, the frequency characteristic and the phase characteristic of the acoustic echo path 7 vary with a place where the handsfree telephone set is set up. The frequency characteristic and the phase characteristic of each of the remaining elements, that is, the speaker amplifier 1, the speaker 2, the microphone 3, and the microphone amplifier 4 do not change.

Figure 3:
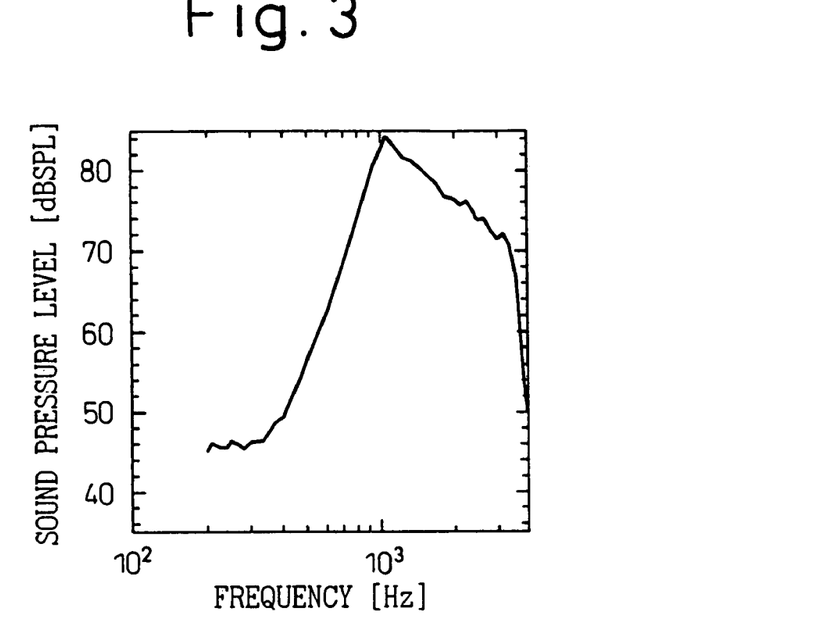
FIG. 3 is a graph illustrating a characteristic of a speaker.
Figure 4:
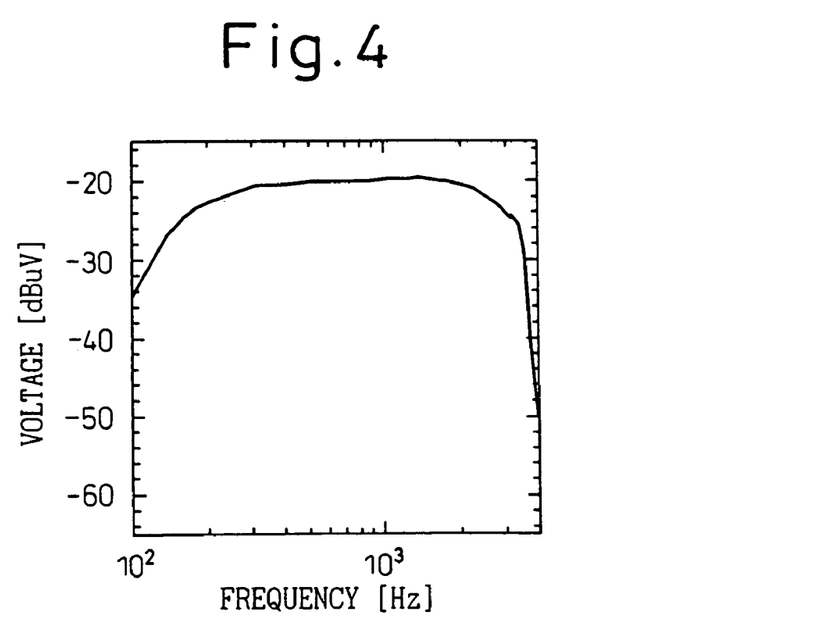
FIG. 4 is a graph illustrating a characteristic of a microphone.

FIG. 3 shows an example of the characteristic of the speaker. Further, FIG. 4 shows an example of the characteristic of the microphone.

Each of these graphs shows the characteristic obtained by letting the voice signal through a corresponding amplifier (not shown) and a PCM CODEC (not shown), which complies ITU-T G. 712, in need thereof for measurement in addition to a corresponding one of the single speaker unit and the single microphone unit. As is seen from FIG. 4, the characteristic of the microphone is represented by a relatively flat and simple curve. In contrast, the characteristic of the speaker shown in FIG. 3 is represented by a complex curve. Incidentally, the frequency characteristics of this amplifier and the PCM CODEC are nearly flat in a voice band. Consequently, most of operations of estimating the frequency characteristic and the phase characteristic of the echo path by the adaptive filter 5 are carried out for estimating the frequency characteristics and the phase characteristics of the acoustic echo path 7 and the speaker 2.

As described above, the frequency characteristics and the phase characteristics to be estimated by the adaptive filter 5 are substantially those of the acoustic echo path 7 and the speaker 2. Among those, the frequency characteristic and the phase characteristic of the speaker 2 do not change at each handsfree conversation. However, in the conventional acoustic echo canceler, the operation of estimating the frequency characteristic and the phase characteristic of the speaker 2 is performed together with the operation of estimating the frequency characteristic and the phase characteristic of the acoustic echo path 7. Thus, when a noise is superposed on a voice signal obtained according to the complex characteristics of the speaker, the frequency characteristics and the phase characteristics of the echo path are not completely estimated. Especially, the frequency characteristic and the phase characteristic of the speaker 7 are insufficiently estimated. Consequently, the conventional acoustic echo canceler has drawbacks in that the operation of canceling echo is unstable, and that the echo cancellation amount is insufficient.

SUMMARY OF THE INVENTION

Accordingly, in view of the aforementioned drawbacks of the conventional acoustic echo canceler, an object of the present invention is to provide an acoustic echo canceler that simultaneously achieves the stabilization and speedup of an estimation operation by distinctly distinguishing a part, such as the speaker, whose frequency characteristic and phase characteristic are fixed, thereof from another part, such as the acoustic echo path, whose frequency characteristic and phase characteristic vary according to an operating environment, thereof, and giving fixed filter characteristic to the former part and allowing only the latter part to perform an operation of estimating the filter characteristic, and that achieves the more improvement of speech quality. According to the present invention, the foregoing object is achieved by preferably utilizing the existing components of the present telephone set, a CPU (Central Processing Unit) or associated components of a DSP (Digital Signal Processor) without adding special means to the present handsfree telephone set.

To achieve the foregoing object, according to an aspect of the present invention, there is provided an acoustic echo canceler for canceling an echo generated by inputting an output of an acoustic device to itself substantially simultaneously with the outputting the output thereof. This acoustic echo canceler comprises an adaptive filter for performing an operation of estimating a frequency characteristic and a phase characteristic of a part, whose frequency characteristic and phase characteristic vary, on an acoustic path, and a fixed coefficient filter for simulating a part, whose frequency characteristic and phase characteristic are fixed, on the acoustic path.

Further, according to another aspect of the present invention, there is provided a handsfree telephone set that comprises a received-voice-signal-side speaker, a transmitted-voice-signal-side microphone, a fixed coefficient filter for giving a predetermined acoustic characteristic to a received voice signal sent from a received voice signal side, a memory for storing acoustic characteristic filter coefficients corresponding to an acoustic path, which includes at least the speaker and leads to a predetermined acoustic echo path and a predetermined microphone, and for providing the filter coefficients to the fixed coefficient filter, an adaptive filter for performing an estimation operation of estimating an acoustic characteristic of the acoustic echo path according to an output of the fixed coefficient filter, and a control portion for performing subtraction of an output of the adaptive filter from a transmitted voice signal sent from the microphone through a microphone amplifier and for outputting an error signal, which represents a result of the subtraction, as an estimation operation control signal for controlling the estimation operation of the adaptive filter.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Figure 5:
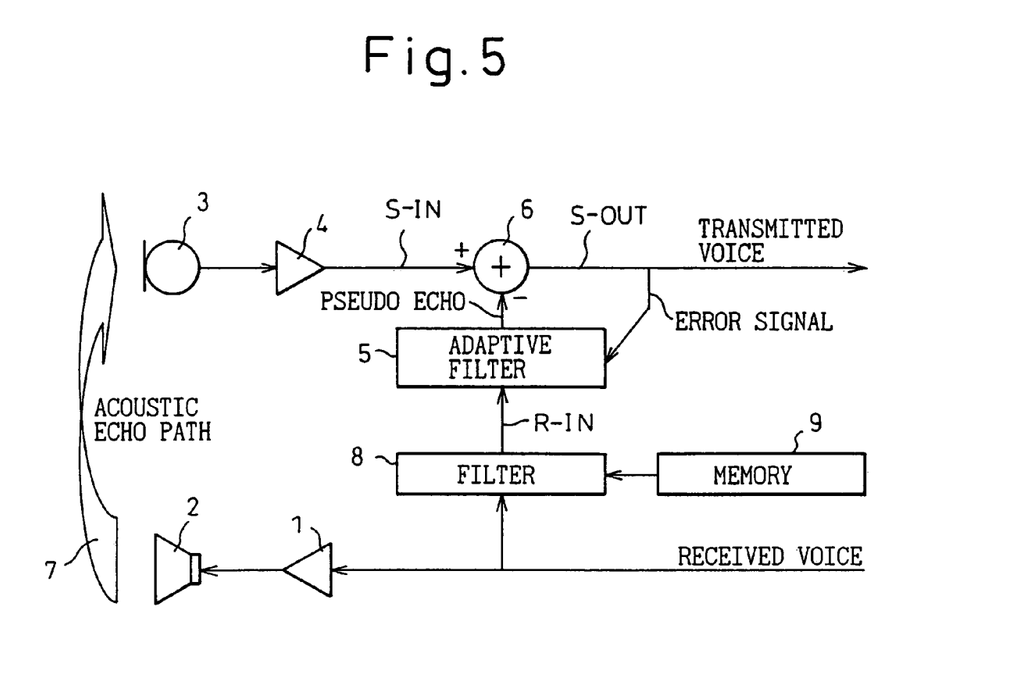
FIG. 5 is a diagram illustrating the basic constitution of an acoustic echo canceler of the present invention.

FIG. 5 illustrates the basic constitution of an acoustic echo canceler of the present invention.

As shown in FIG. 5, an acoustic echo canceler of the present invention has a filter 8 for performing filtering processing according to given and fixed frequency characteristic and phase characteristic, and a memory 9 for storing filter coefficients of the filter 8, in addition to a conventional adaptive filter 5. The filter 8 is placed at the input terminal side (R-IN) of the conventional adaptive filter 5 and performs filtering processing on received voice signals inputted thereto by using the filter coefficients read from the memory 9. Then, an output of the filter 8 is inputted to the input terminal (R-IN) of the adaptive filter 5.

The memory 9 stores the filter coefficients obtained from results of the measurement of the frequency characteristic and the phase characteristic of the speaker 2. Thus, the characteristics of an output signal obtained as a result of filtering processing performed in the filter 8 by using the filter coefficients read from the memory 9 are the same as those of an output voice of the speaker 2. Therefore, according to the present invention, the active filter 5 does not need to estimate the frequency characteristic and the phase characteristic of the speaker 2.

That is, although the complex frequency characteristic and phase characteristic of the speaker 2 is not fully estimated by the adaptive filter 5 according to a conventional method owing to the presence of noise, the state of the filter, which is equivalent to a state where the estimation of the frequency characteristic and phase characteristic of the speaker is completely achieved, is provided as an initial state by using the filter 8 of the present invention. Thus, the adaptive filter 5 of the present invention has only to estimate the frequency characteristic and the phase characteristic of the acoustic echo path 7. This enables the acoustic echo canceler to provide a sufficient amount of echo cancellation and quick convergence of an echo canceling operation. Consequently, the speech quality is improved still more.

Incidentally, in the foregoing description, it has been described that the filter 8 and the memory 9 are used for obtaining only the frequency characteristic and the phase characteristic of the speaker 2, which has the complex characteristics. However, objects to be obtained by using the filter 8 and the memory 9 are not limited to such characteristics. The objects to be obtained by using the filter 8 and the memory 9 may include the synthesized frequency characteristic and the synthesized phase characteristic of the parts each having the fixed frequency characteristic and the fixed phase characteristic, that is, the speaker amplifier 1, the speaker 2, the microphone 3, and the microphone amplifier 4. Furthermore, the objects to be obtained by using the filter 8 and the memory 9 may include the specific environmental characteristics of the acoustic echo path 7, for example, the frequency characteristic and the phase characteristic of an anechonic chamber or a specific vehicle.

Figure 6:
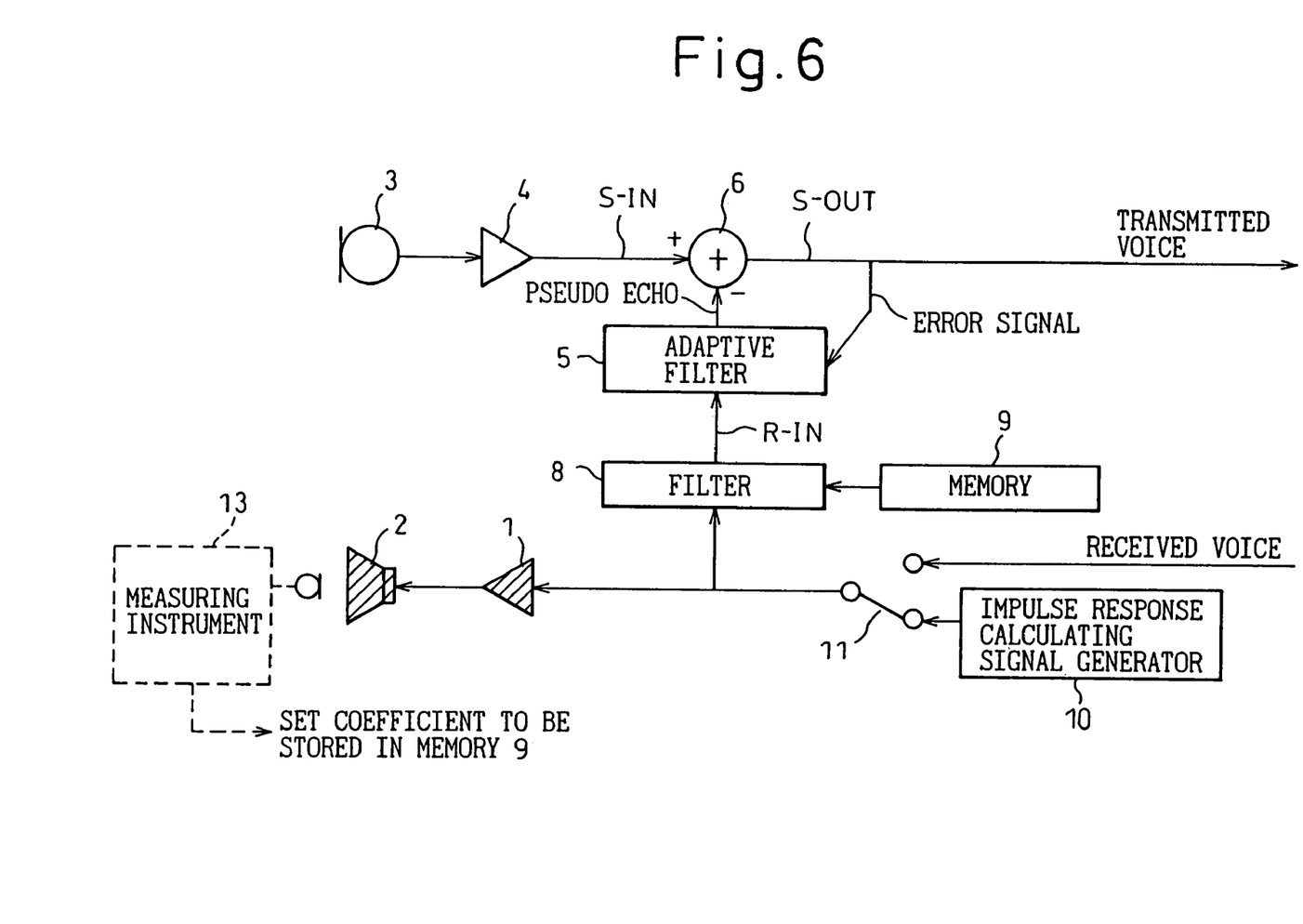
FIG. 6 is a diagram illustrating a first modification of the basic constitution shown in FIG. 5.

FIG. 6 illustrates a first modification of the basic constitution shown in FIG. 1.

The first modification illustrated in FIG. 6 additionally comprises an impulse response calculating signal generator 10, and a switch 11 for switching between an output signal of the impulse response calculating generator 10 and a received voice signal. According to the present invention, when the frequency characteristic and the phase characteristic of the speaker 2, the data on which is stored in the memory 9 as representing the filter coefficients of the filter 8 are measured, the switch 11 for switching between an output signal of the impulse response calculating signal generator 10 and the received voice signal is switched to a position at the side of the impulse response calculating signal generator 10.

Practically, the impulse response calculating signal generator 10 and the switch 11 are constituted by using the CPU or the DSP circuits in the handsfree telephone set. Thus, an impulse response calculating signal, which is best suited to measuring the acoustic characteristics, can be directly generated without adding additional components and wirings thereto. In this modification, an acoustic measuring instrument 13 is installed just by the speaker 2. Upon completion of measurement of the frequency characteristic and the phase characteristic only of the speaker 2 (to be precise, the frequency characteristics and the phase characteristics of the speaker amplifier 1 and the speaker 2), the filter coefficients of the filter 8, which are calculated according to the measured characteristics, are written to the memory 9 by performing a manual operation.

Figure 7:
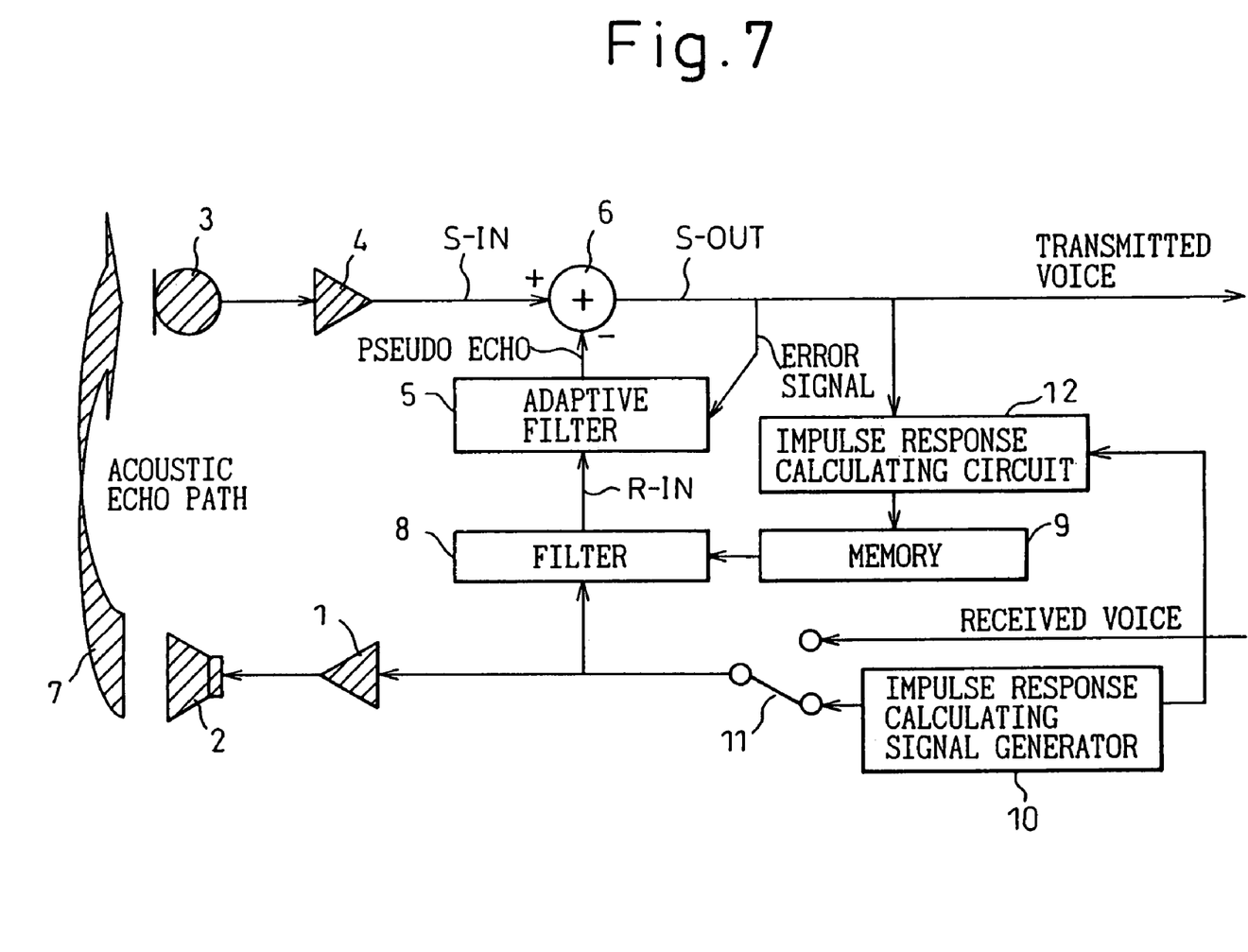
FIG. 7 is a diagram illustrating a second modification of the basic constitution shown in FIG. 5.

Meanwhile, FIG. 7 illustrates a second modification of the basic constitution shown in FIG. 1.

The second modification illustrated in FIG. 7 has an impulse response calculating circuit 12 in addition to the impulse response calculating signal generator 10 and the switch 11 for switching between an output signal of the impulse response calculating signal generator 10 and a received voice signal. Thus, the acoustic echo canceler of the present invention can hold an impulse response, which is estimated by itself (actually, by the handsfree telephone set itself), in the memory 9.

In this second modification, a signal generated by the impulse response calculating signal generator 10 is inputted to the microphone 3 through the speaker amplifier 1, the speaker 2, and the acoustic echo path 7. This signal is then inputted to the impulse response calculating circuit 12 through the microphone amplifier 4 and the adder 6. The impulse response calculating circuit 12 operates in synchronization with the impulse response calculating signal generator 10. Thus, the impulse response is calculated. Subsequently, the calculated impulse response is held in the memory 9.

In this second modification, the impulse response calculating circuit 12 is constituted by using the CPU or the DSP circuits in the handsfree telephone set, similarly as the impulse response calculating signal generator 10 and the switch 11. Thus, there is no necessity for adding additional components and wirings thereto. Further, in this second modification, a result of the calculation of an impulse response in the impulse response calculating circuit 12 is automatically written to the memory 9 as the filter coefficients. To be exact, the filter coefficients based on results of measurement of the frequency characteristic and the phase characteristic of the speaker amplifier 1, the speaker 2, the acoustic echo path 7, the microphone 3, and the microphone amplifier 4, which are indicated by being diagonally shaded, are written to the memory 9. Incidentally, the measurement is performed in an anechonic chamber so as to eliminate disturbances from the acoustic echo path 7.

Figure 8:
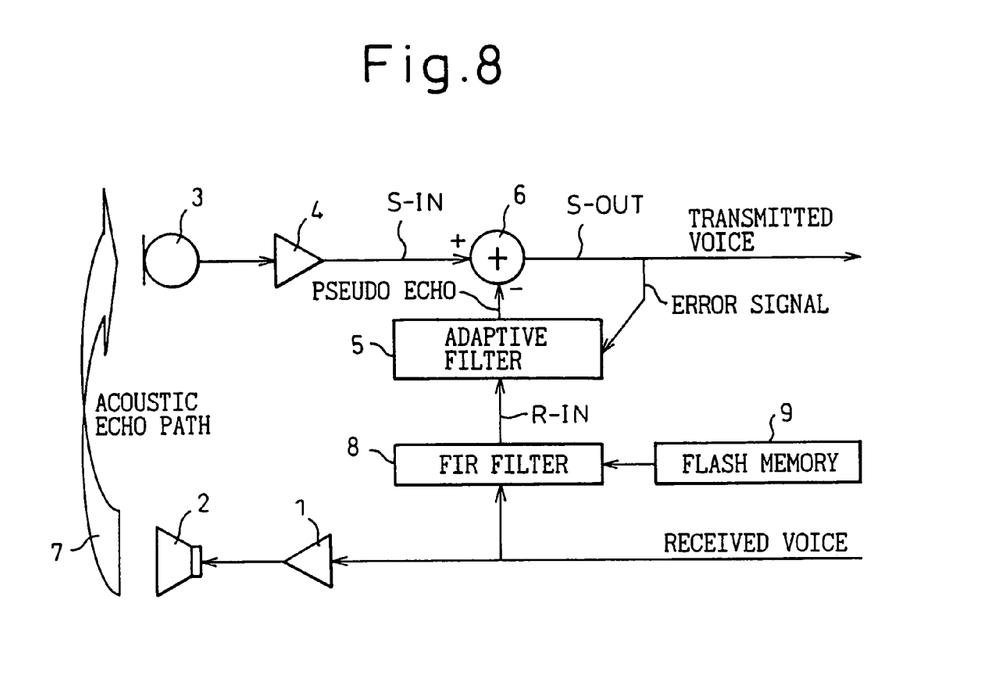
FIG. 8 is a diagram illustrating a first embodiment of the present invention.

FIG. 8 illustrates a first embodiment of the present invention.

This embodiment corresponds to the basic configuration according to the present invention, which is illustrated in FIG. 5. In this embodiment, an FIR filter is used as the filter 8. Further, a nonvolatile flash memory is used as the memory 9. Incidentally, an operation of each of the remaining constituent elements, that is, the speaker amplifier 1, the speaker 2, the acoustic echo path 7, the microphone 3, the microphone amplifier 4, the adaptive filter 5, and the adder 6 is similar to that of the corresponding constituent element of the conventional acoustic echo canceler.

Figure 9:
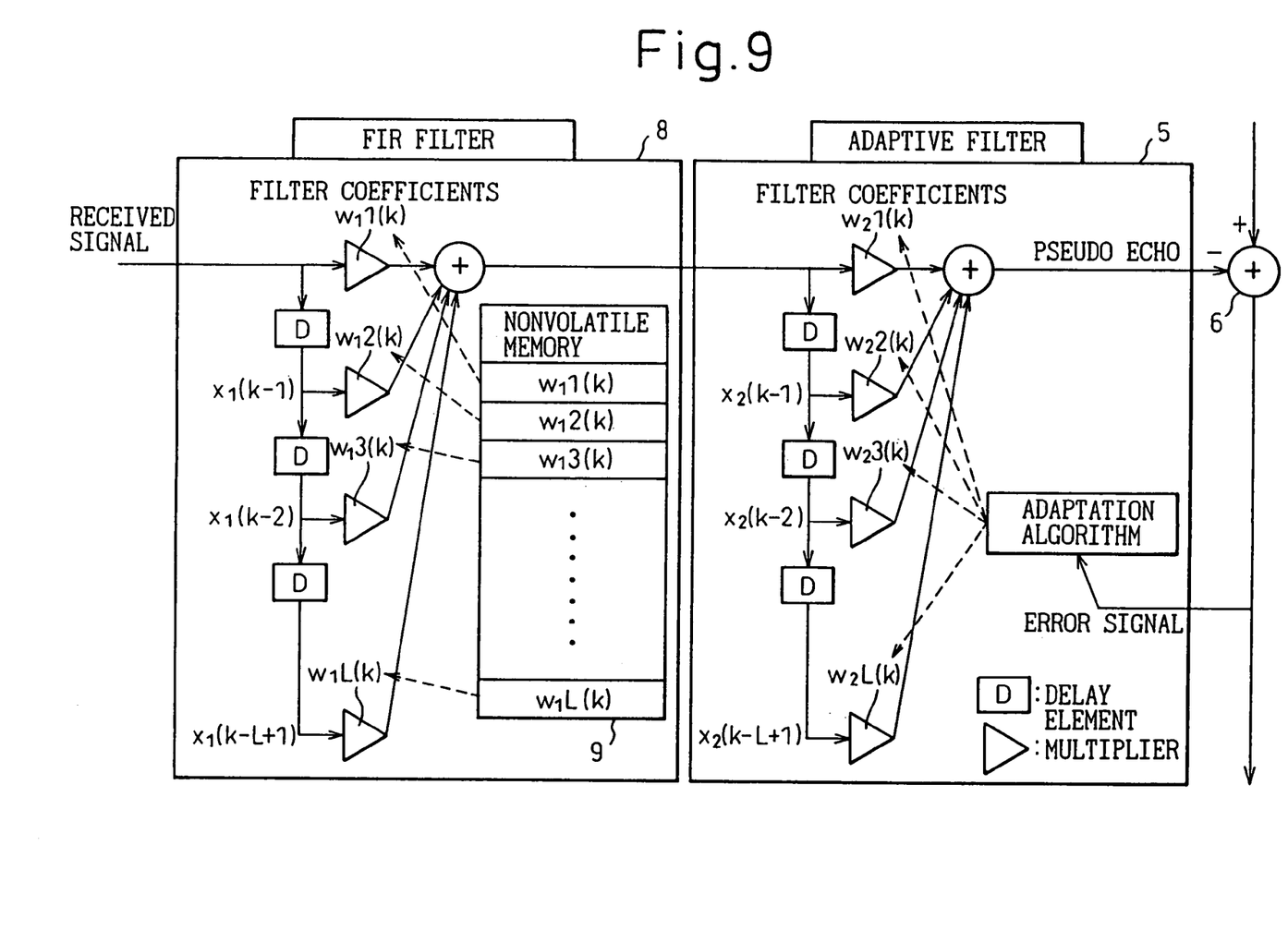
FIG. 9 is a diagram illustrating the constitution of an operation block.

FIG. 9 illustrates a circuit block, which consists of the FIR filter 8, the flash memory 9, the adaptive filter 5, and the adder 6, in detail.

Figure 10:
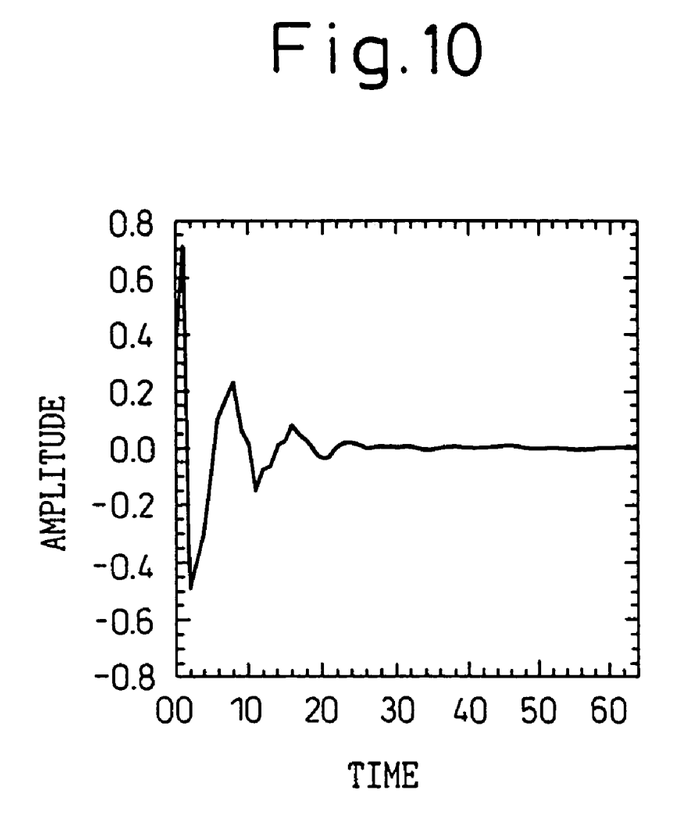
FIG. 10 is a graph illustrating an impulse response of a speaker.

A received signal is inputted to the FIR filter 8, which reads the filter coefficients from the flash memory 9 and uses the read filter coefficients. The filter coefficients stored in the flash memory 9 are the impulse response of the speaker 2, which is separately measured. FIG. 10 shows an example of the impulse response of this speaker. This impulse response was measured in an environment in which no noise is present, such as an anechonic chamber.

For example in the case that the 64-tap FIR filter 8 is constituted from sampled values of an impulse response, a 128-byte area of the flash memory 9 is used. As described above, an output of the FIR filter 8 is made by utilizing the impulse response of the speaker 2 as the filter coefficients of the FIR filter 8 to be equivalent to an output voice of the speaker 2. That is, the state of the output of the FIR filter 8 becomes equivalent to a state, in which the estimation of the frequency characteristic and the phase characteristic of the speaker 2 is completely achieved, regardless of noise in an environment in which the handsfree telephone set is used. Incidentally, the operation of the circuit of the FIR filter, to which the fixed coefficients are given, is publicly known. Further, the adaptive filter 5 has been described by referring to FIG. 2. Thus, the description thereof is omitted herein.

Figure 11:
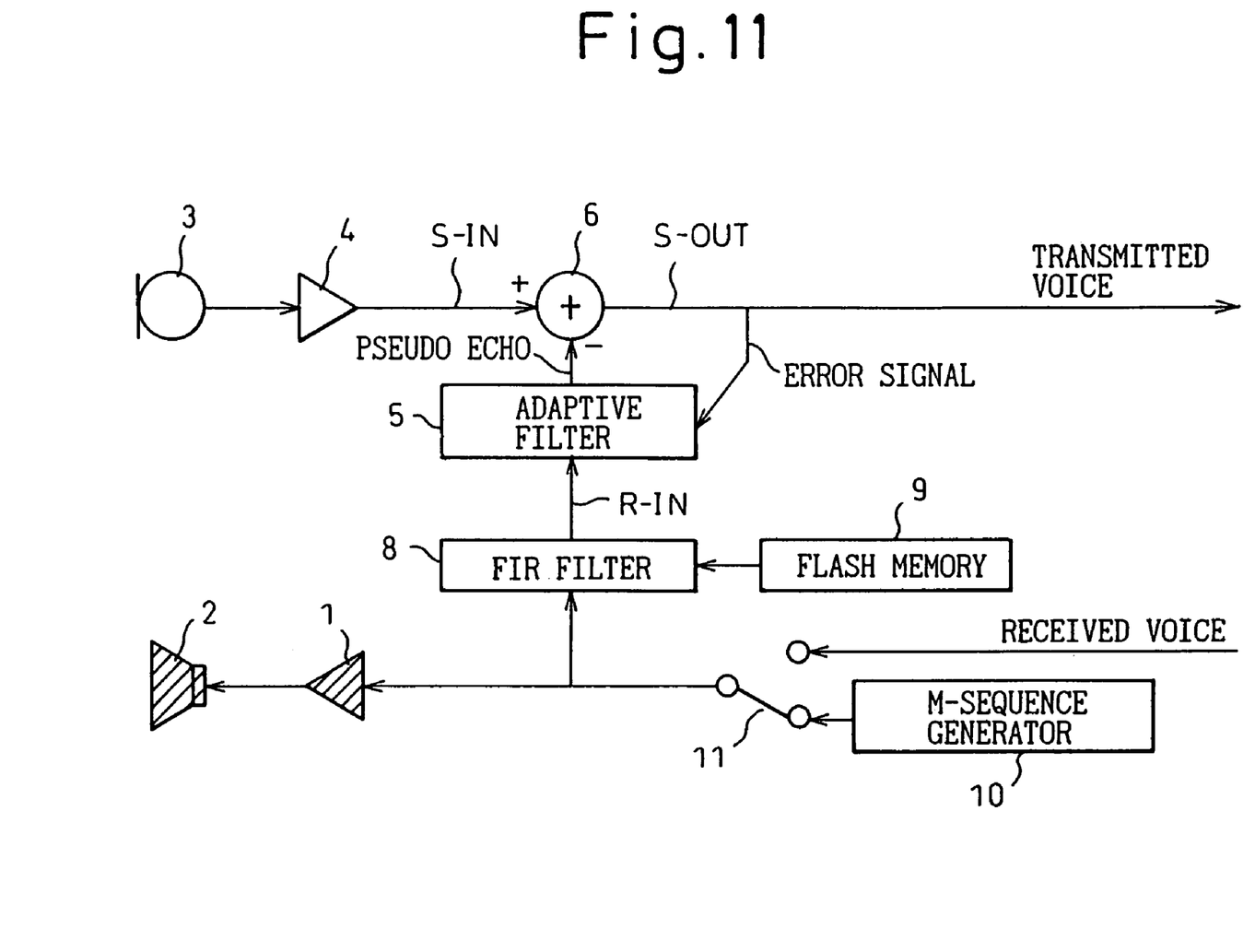
FIG. 11 is a diagram illustrating a second embodiment of the present invention.

FIG. 11 illustrates a second embodiment of the present invention.

This embodiment corresponds to the first modification of the present invention, which is illustrated in FIG. 6. The second embodiment employs an FIR filter as the filter 8, and also employs a nonvolatile flash memory as the memory 9, similarly as in the case of FIG. 8. The second embodiment further employs an M-sequence (or maximum length sequence) signal generator 10 as the impulse response calculating signal generator shown in FIG. 6.

When the impulse response of the speaker is measured, the switch 11 is switched to a position at the side of the M-sequence signal generator 10. Thus, a voice corresponding to an M-sequence signal is outputted from the speaker 2. The outputted voice corresponding to the M-sequence signal is recorded by using a microphone illustrated as the measuring instrument 13 of FIG. 6. The impulse response of the speaker 2 is calculated according to the recorded signal. Techniques of calculating the impulse response from the outputted M-sequence signal are described in, for instance, the Journal of the Acoustical Society of Japan, vol. 52, No. 10, 1996, pp. 752–759. According to what is called an M-sequence method, white pseudo random noise is used for measurement.

Incidentally, a time lag may occur in the recorded impulse response. Nevertheless, in the case that the recorded impulse response differs only in the time lag from a proper impulse response, the time lag is canceled by the adaptive filter 5 located subsequently to the filter 8. Therefore, the performance of the acoustic echo canceler is not degraded. Thus, the M-sequence signal generator 10 is provided in the internal circuit of the handsfree telephone set. Moreover, the switch is provided and adapted to switch between an output signal of the M-sequence signal generator and a received signal. Consequently, the measurement of the impulse response, which is to be set in the flash memory 9, of the speaker 2 can be performed without changing the existing components and wires of the telephone set.

Figure 12:
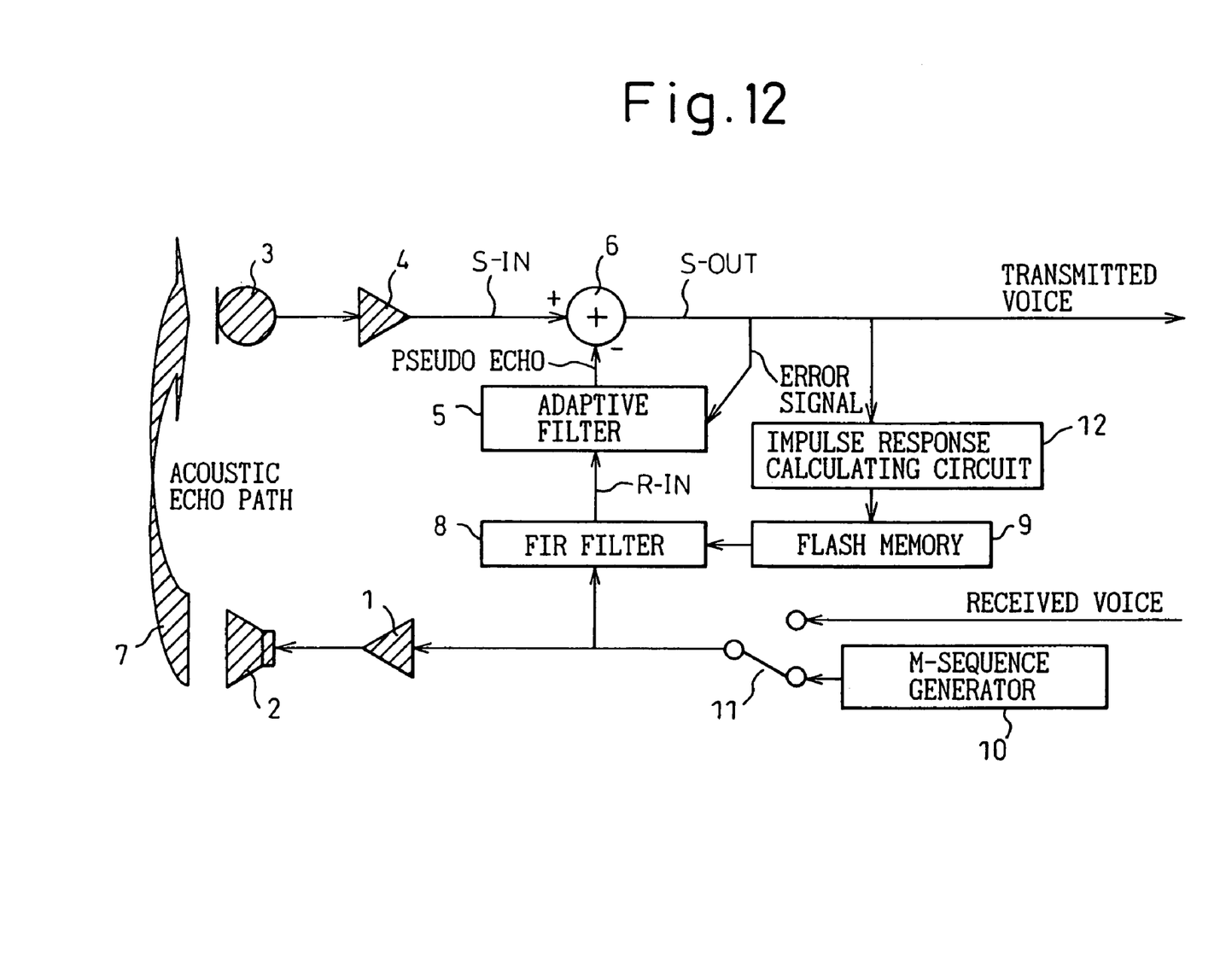
FIG. 12 is a diagram illustrating a third embodiment of the present invention.

FIG. 12 illustrates a third embodiment of the present invention.

This embodiment corresponds to the second modification of the present invention, which is illustrated in FIG. 7. This embodiment is obtained by additionally placing an impulse response calculating circuit 12 on a branch line from a transmission voice signal line in the second embodiment. With such a constitution, the handsfree telephone set is enabled to automatically set the impulse response, which is to be set in the flash memory 9, only by switching the switch 11 to a position at the side of the M-sequence signal generator 10.

Further, when the aforementioned implementation of the present invention is performed, the FIR filter 8 may be replaced with a process consisting of a step of performing discrete Fourier transform, a step of performing a multiplication of a result of the discrete Fourier transform and each of filter coefficients stored in the flash memory, and a step of performing inverse discrete Fourier transform. Thus, it is easily inferred that arithmetic processing in the filter 8 can be speeded up. Furthermore, it is easily inferred that the M-sequence signal generator 10 can be replaced with an impulse generating circuit or a TSP (Time Stretched Pulse) signal generating circuit, and that the impulse response measuring method can be replaced with another method suited to the corresponding generating circuit.

Figure 13:
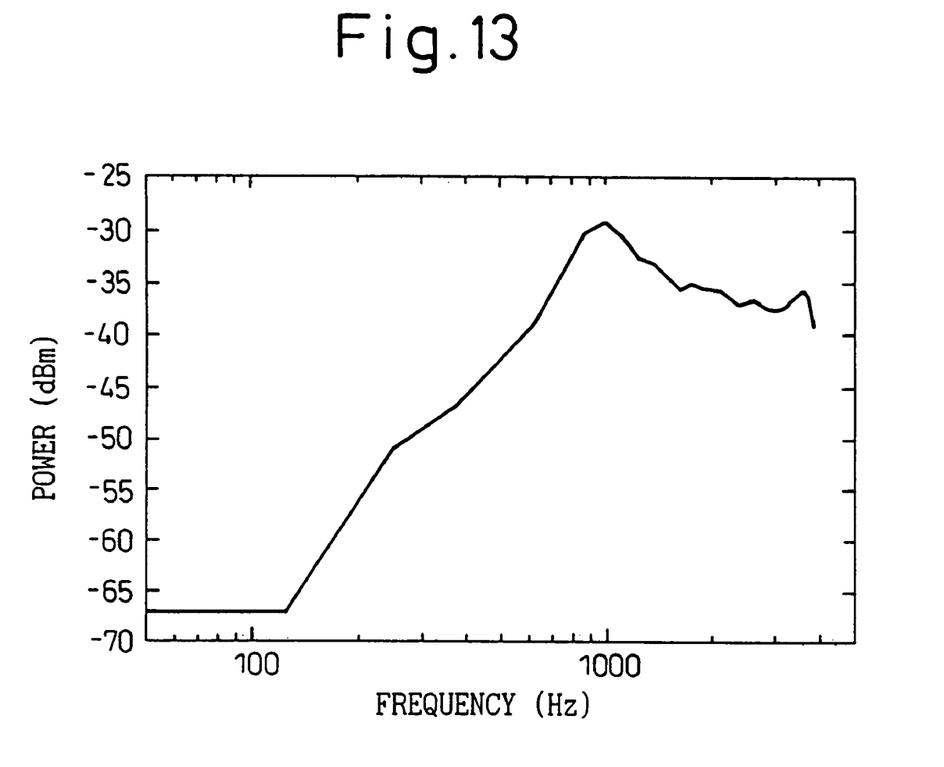
FIG. 13 is a graph illustrating a frequency characteristic obtained from an impulse response calculated in the second embodiment.
Figure 14:
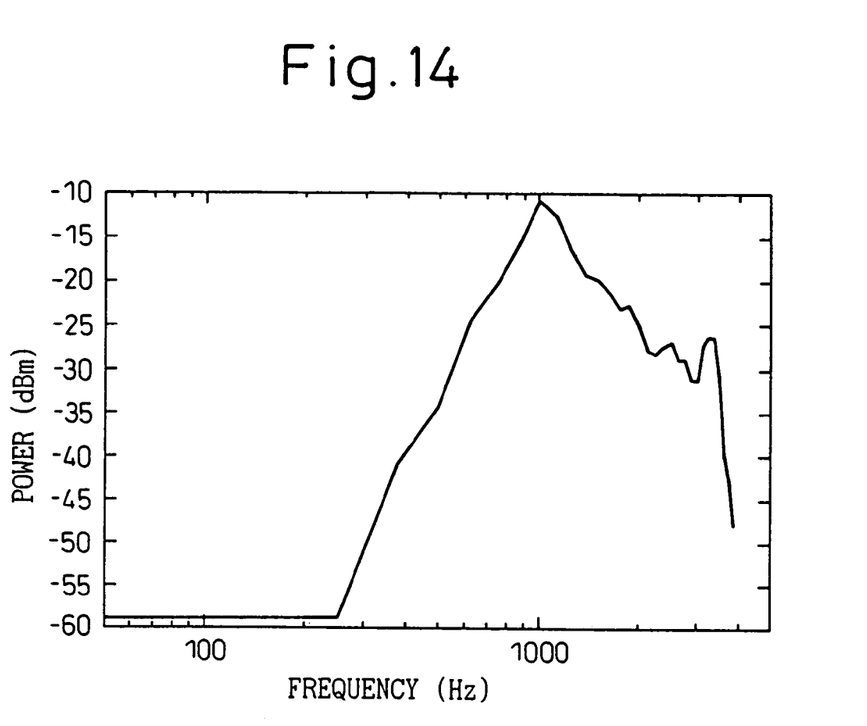
FIG. 14 is a graph illustrating a frequency characteristic obtained from an impulse response calculated in the third embodiment.

FIG. 13 illustrates an example of the frequency characteristic obtained from the impulse response that was calculated in the second embodiment illustrated in FIG. 11. Meanwhile, FIG. 14 illustrates an example of the frequency characteristic obtained from the impulse response that was calculated in the third embodiment illustrated in FIG. 12. In either case, the impulse response was calculated at points on the transmission voice signal line. The characteristic illustrated in FIG. 13 includes those of the speaker amplifier 1 and the speaker 2, on which filtering is performed by the FIR filter 8. In contrast, the characteristic illustrated in FIG. 14 includes those of the speaker amplifier 1, the speaker 2, the acoustic echo path 7, the microphone 3, and the microphone amplifier 4. With such a constitution, the present invention can alleviate a load at which the adaptive filter 5 performs an estimation operation. Consequently, it is expected that the estimation operation is more accurately and quickly performed.

Figure 15:
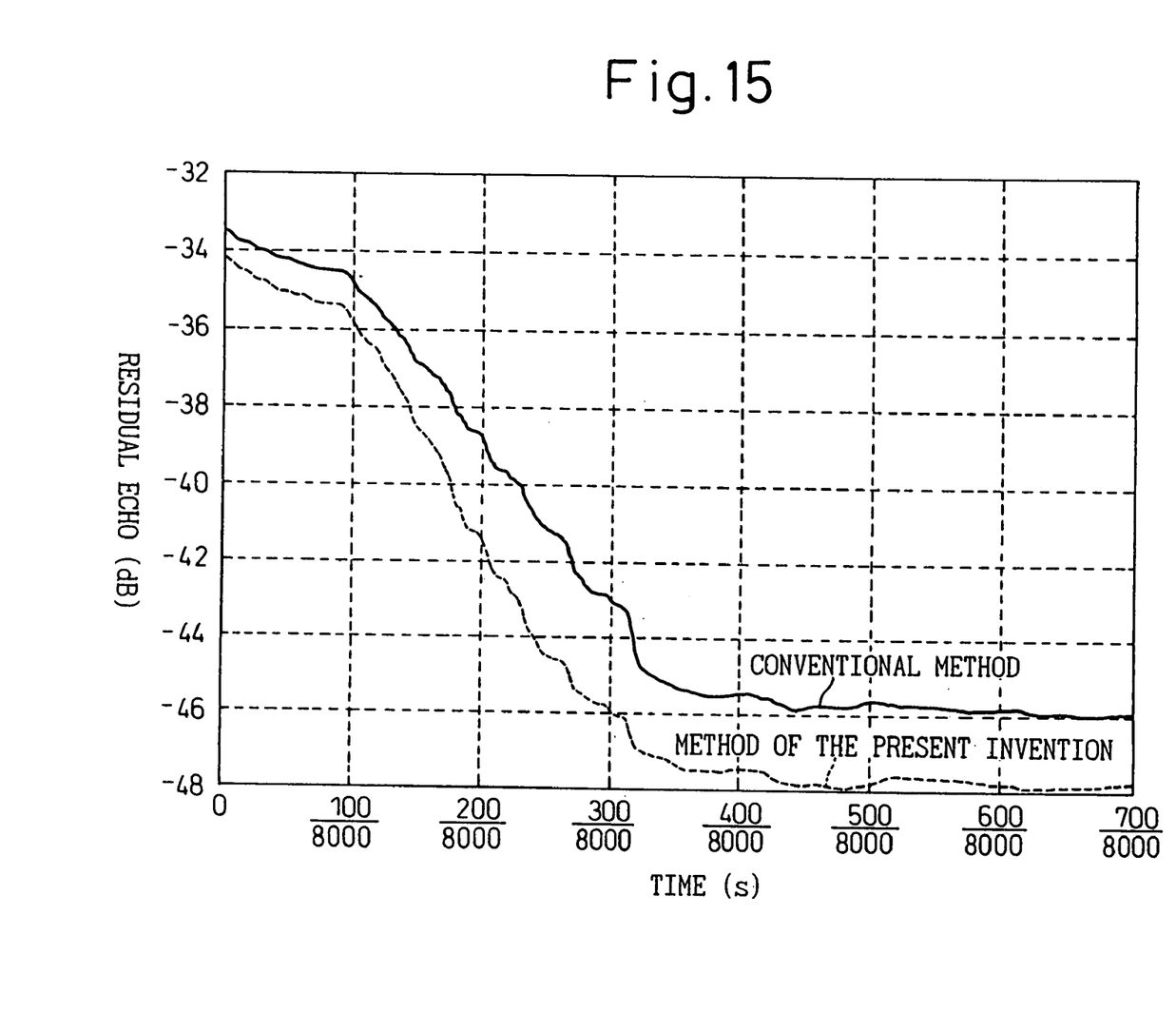
FIG. 15 is a graph illustrating the relation between the convergence rate of filter coefficients and the magnitude of residual echo, which are obtained in an adaptation operation of each of the conventional acoustic echo canceler and the third embodiment of the present invention, for comparison.

FIG. 15 illustrates the relation between the convergence rate of filter coefficients and the magnitude of residual echo, which are obtained in an adaptation operation of each of the conventional acoustic echo canceler of FIG. 1 and the third embodiment of the present invention having the characteristics shown in FIG. 14, for comparison. In FIG. 15, a dashed curve indicates the relation therebetween in the case of the third embodiment of the present invention, while a solid curve indicates the relation therebetween in the case of the conventional acoustic echo canceler. As is seen from this figure, the third embodiment of the present invention clearly surpasses the conventional canceler in convergence rate. Further, the residual echo in the case of the third embodiment is improved by approximately 2 dB, as compared with that of the conventional canceler. Further, a change amount of each of the filter coefficients is small when converges. Thus, it is expected that the third embodiment performs a stable converging operation.

As described above, according to the present invention, the impulse response of the speaker are obtained as the filter coefficients by filtering performed by the filter, whose coefficients are fixed, before received voice signals are inputted to the adaptive filter. Thus, the present invention realizes the state, in which the estimation of the frequency characteristic and the phase characteristic of the speaker is completely achieved, differently from the conventional canceler, which cannot realize such a state owing to the presence of noise. Consequently, the amount of echo cancellation noticeably increases.

Further, according to the present invention, even when a time lag occurs between the impulse response recorded in the memory and the proper impulse response, the adaptive filter 5 placed subsequently to the filter having the fixed coefficients cancels the time lag in the case that the impulse response recorded in the memory differs from the proper impulse response only in the time lag. Thus, the performance is not degraded. Consequently, restrictions on the setting of the impulse response to be set in the memory 9 are mitigated. Thus, the operation of the filter is stabilized.

Moreover, according to the present invention, the handsfree telephone set has an impulse response calculating signal generator, and a switch for switching between a received signal and an output signal of the impulse response calculating signal generator. Thus, the measurement of the impulse response of the speaker, which are to be set in the memory, can be performed only by using components and wirings of the internal circuit of the handsfree telephone set. There is no need for adding other components to the telephone set and for altering the existing components thereof.

Furthermore, according to the present invention, the handsfree telephone set has an impulse response calculating circuit 12 provided at a place on a branch line from the transmission signal line. Thus, the impulse response of the speaker, which is to be set in the memory, is enabled by switching a path changing switch to a position at the side of the impulse response calculating signal generator.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. An acoustic echo canceler to cancel an acoustic echo caused by an acoustic signal output from a speaker and received by a microphone, comprising:
    an adaptive filter for performing an operation of estimating frequency and phase characteristics of an acoustic path including at least the speaker, the microphone and an acoustic echo path therebetween, and for filtering a signal output from a fixed coefficient filter;
    the fixed coefficient filter for simulating a part of the frequency and phase characteristics of the acoustic path including at least fixed frequency and phase characteristics of the speaker, and for filtering a signal provided thereto and to the speaker; and
    a subtractor for substracting the signal filtered by the adaptive filter from a signal output from the microphone, thereby canceling the acoustic echo.

2. The acoustic echo canceler according to claim 1, which further comprises a memory for storing filter coefficients that are read by said fixed coefficient filter and that correspond to the part, whose frequency characteristic and phase characteristic are fixed.

3. The acoustic echo canceler according to claim 2, which further comprises an impulse-response-calculating-signal generating portion for generating an impulse response calculating signal to be used for calculating an impulse response of said acoustic device.

4. The acoustic echo canceler according to claim 3, which further comprises an impulse response calculating portion for performing calculation of an impulse response of said acoustic device from the impulse response calculating signal inputted to said acoustic device and for causing said memory to store filter coefficients obtained as a result of the calculation.

5. A handsfree telephone set comprising:
    a received-voice-signal-side speaker;
    a transmitted-voice-signal-side microphone;
    an adaptive filter for performing an operation of estimating frequency and phase characteristics of an acoustic path including at least the speaker, the microphone and an acoustic echo path therebetween, and filtering a signal output from a fixed coefficient filter;
    the fixed coefficient filter for simulating a part of the frequency and phase characteristics of the acoustic path including at least fixed frequency and phase characteristics of the speaker, and for filtering a signal provided thereto and to the speaker on a received-voice-signal side;
    a memory for storing fixed filter coefficients for the part of the frequency and phase characteristics simulated by the fixed coefficient filter, and for providing the fixed filter coefficients to the fixed coefficient filter; and
    a control portion for controlling the estimation operation of the adaptive filter to cancel an acoustic echo caused by an acoustic signal output from the speaker and received by the microphone, by reducing an error represented by an error signal produced by subtracting the signal filtered by the the adaptive filter from a signal output by the microphone on a transmitted-voice signal side.

6. The handsfree telephone set according to claim 5, which further comprises an impulse-response-calculating-signal generating circuit at the received voice signal side, wherein an impulse response calculating signal is outputted therefrom through said speaker.

7. The handsfree telephone set according to claim 6, which further comprises a switch for providing the impulse response calculating signal or the received voice signal to the received voice signal side.

8. The handsfree telephone set according to claim 7, which further comprises an impulse response calculating circuit for performing calculation of an impulse response from the impulse response calculating signal received at a transmitted voice signal side through said microphone and for causing said memory to store filter coefficient values obtained as a result of the calculation.

9. The handsfree telephone set according to claim 6, which further comprises an impulse response calculating circuit for performing calculation of an impulse response from the impulse response calculating signal received at a transmitted voice signal side through said microphone and for causing said memory to store filter coefficient values obtained as a result of the calculation.

* * * * *